(12) United States Patent
Iryami et al.

(10) Patent No.: US 7,032,139 B1
(45) Date of Patent: Apr. 18, 2006

(54) BIT ERROR RATE TESTER

(75) Inventors: Farhad Iryami, Millbrae, CA (US);
Paul Gentieu, Sunnyvale, CA (US)

(73) Assignee: Finisar Corporation, Sunnyvale, CA (US)

( * ) Notice: Subject to any disclaimer, the term of this patent is extended or adjusted under 35 U.S.C. 154(b) by 229 days.

(21) Appl. No.: 10/179,760

(22) Filed: Jun. 24, 2002

Related U.S. Application Data

(60) Provisional application No. 60/365,875, filed on Mar. 18, 2002.

(51) Int. Cl.
*H03M 13/01* (2006.01)

(52) U.S. Cl. ............... 714/704; 398/16; 398/27; 714/715; 714/716

(58) Field of Classification Search ............ 398/16, 398/27; 714/704, 715–716; 370/429; H03M 13/01
See application file for complete search history.

(56) References Cited

U.S. PATENT DOCUMENTS

| | | | |
|---|---|---|---|
| 5,623,497 A * | 4/1997 | Shimawaki et al. ........ 714/704 |
| 6,069,876 A * | 5/2000 | Lander et al. ............. 370/249 |
| 6,268,808 B1 | 7/2001 | Iryami et al. |
| 6,628,621 B1 * | 9/2003 | Appleton et al. .......... 370/249 |
| 2001/0033568 A1* | 10/2001 | Spooner .................... 370/429 |
| 2002/0129307 A1* | 9/2002 | Walker et al. ............. 714/715 |
| 2002/0149812 A1* | 10/2002 | Hong et al. ................ 359/110 |
| 2002/0150334 A1* | 10/2002 | Richardson et al. ......... 385/37 |
| 2002/0176139 A1* | 11/2002 | Slaughter et al. .......... 359/172 |
| 2003/0005385 A1* | 1/2003 | Stieger ....................... 714/704 |
| 2003/0026332 A1* | 2/2003 | Taunton ...................... 714/786 |
| 2003/0097622 A1* | 5/2003 | Liu et al. ................... 714/704 |

OTHER PUBLICATIONS

Ohtomo, Y.; Yoshida, T.; Nishisaka, M.; Nishimura, K.; Shimaya, M.; Solid-State Circuits Conference, 2000. Digest of Technical Papers. ISSCC. 2000 IEEE International, Feb. 7-9, 2000; pp.: 58-59.*
ATM Forum Technical Committee;622 and 2488 Mbit/s Cell-Based Physical Layer; Jul., 1999; ATM Forum approved specification af-phy-0128.000; pp. i-23 URL: ftp://ftp.atmforum.com/pub/approved-specs/af-phy-0128.000.pdf.*
*GTX-B Bit Error Rate Tester, The Extended Physical Layer Verification System,* Finisar Corporation, Sunnyvale, California, Jun. 2000, 4 pages.
*GTX-B Bit Error Rate Test System, Fibre Channel, Gigabit Ethernet, Gigabit-Rate Physical Layer Verification System,* Finisar Corporation, Sunnyvale, California, Dec. 2000, 4 pages.

* cited by examiner

*Primary Examiner*—R. Stephen Dildine
(74) *Attorney, Agent, or Firm*—Workman Nydegger (57) ABSTRACT

The present invention is a bit error rate tester that may operate on network paths having devices that add or drop idles within a transmitted bit sequence. In particular, the bit sequence determines whether a received bit sequence is synchronized. If the received sequence is not synchronized or if a certain event/threshold is reached, then the bit error rate tester re-synchronizes the sequence prior to analysis. Also, the bit error rate detector is able to operate on high-speed networks and provide bit granularity measurements.

39 Claims, 9 Drawing Sheets

BIT ERROR RATE TESTER

This application claims the benefit of Provisional Application No. 60/365,875, filed Mar. 18, 2002.

BACKGROUND

A. Technical Field

The present invention relates generally to network error detection and management devices, and more particularly, to network bit error rate testing.

B. Background of the Invention

The proliferation and significance of networking technology is well known. The ever-increasing demand for network bandwidth has resulted in the development of technology that increases the amount of data that can be pushed through a single channel on a network. Advancements in modulation techniques, coding algorithms and error correction have vastly increased the rates at which data travels across networks. For example, a few years ago, the highest rate that data could travel across a network was at about one Gigabit per second. This rate has increased ten-fold today where data travels across Ethernet and SONET networks at upwards of 10 Gigabits per second. Accurate error rate measurement during the development, manufacturing and installation of these networks is very important in order to ensure the integrity of data traveling across them once the network is in operation.

Traditionally, bit error rate testers have been used to determine an error rate along a particular path on a network. The bit error rate tester would transmit a bit sequence onto the network path and analyze the sequence when it returned. Typically, this analysis included the network. From this comparison, errors within the sequence were identified and counted resulting in a calculation of a bit error rate.

These traditional bit error rate testers were very limited as to the network paths that they could test. For example, if a network device inserted a fill word into the bit sequence (e.g., as part of a normal clock rate matching procedure), the transmitted and received bit sequences would not be synchronized and the bit error rate test could not meaningfully occur after the fill word was inserted. As a result, traditional bit error rate testers are limited to testing paths which do not insert or drop idles or fill words.

Accordingly it is desirable to provide a bit error rate tester that can compensate for modified idle or filler words surrounding a bit sequence. In particular, it is desirable to provide a bit error rate tester that can re-synchronize a received bit sequence and perform an error rate test on the sequence. Furthermore, it is desirable to provide such a bit error rate tester that is operable in today's high data rate networks.

SUMMARY OF THE INVENTION

The present invention is a bit error rate tester having multiple network interfaces to which different types of networks may connect. The bit error rate tester is used to test the integrity of paths within a network by transmitting a bit sequence onto the path and then analyzing the sequence after it returns. In particular, a bit-by-bit analysis is performed by the bit error rate tester on the received bit sequence in order to determine the number of errors in the sequence. The bit error rate tester is also able to determine whether a received bit sequence is synchronized, and if it is not, re-synchronize the bit sequence.

A word generator creates a bit sequence that will be used for testing the error rate of a network path. The bit sequence is generated using pre-stored data within a memory device or generated according to a pre-defined polynomial so that the bit sequence can be regenerated at the receiver side of the bit error rate tester. The created bit sequence is transmitted onto a network path and returned to the bit error rate tester. A word aligner receives the bit sequence from the network and makes sure that the sequence is synchronized. Specifically, the word aligner will detect a sequence that is out-of-sync and be able to compensate by re-synchronizing.

A comparator determines the bit error rate of the particular network path using the received bit sequence. The received bit sequence is compared to a regenerated bit sequence using the pre-stored data in the memory device. The comparator counts the number of errors within the bit sequence and a bit error rate is calculated.

The figures depict an embodiment of the present invention for purposes of illustration only. One skilled in the art will recognize from the following discussion that alternative embodiments of the structures and methods illustrated herein may be employed without departing from the principles of the invention described herein.

DETAILED DESCRIPTION OF THE PREFERRED EMBODIMENTS

An apparatus and method for testing bit error rates on a network path is described. In the following description, for purposes of explanation, specific details are set forth in order to provide an understanding of the invention. It will be apparent, however, to one skilled in the art that the invention can be practiced without these details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

A. System Overview

Figure 1:
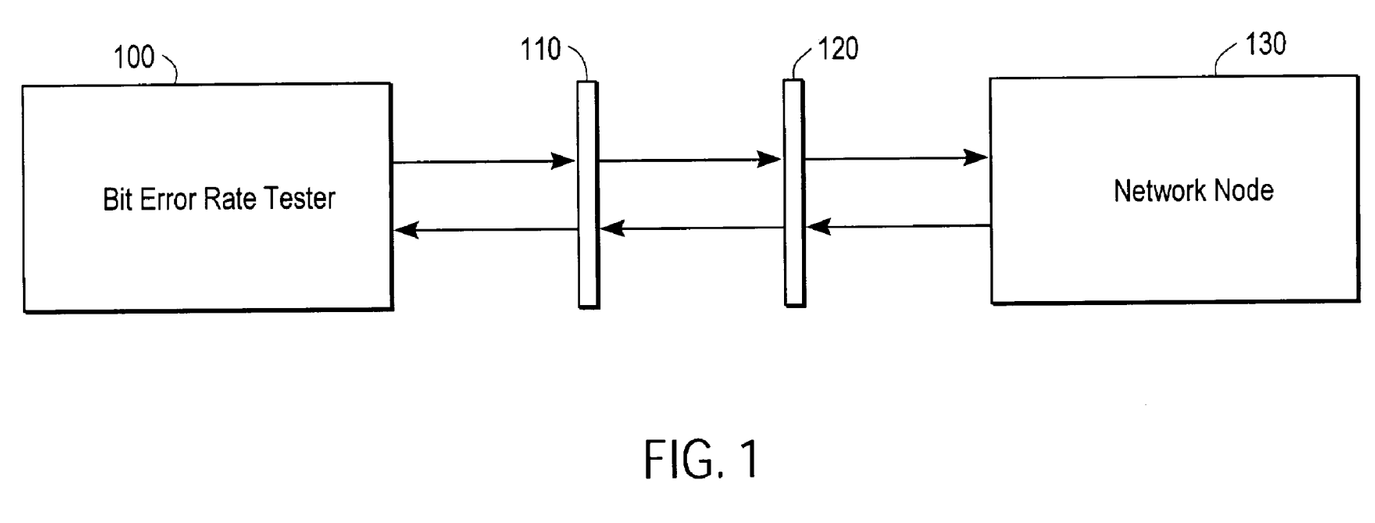
FIG. 1 is an illustration of a system in accordance with the present invention.

FIG. 1 describes a system in which the present invention may be implemented. A network is shown comprising various network devices. According to one embodiment of the invention, the network is a 10 Gigabit Ethernet network. A bit error rate tester 100 is coupled into a network and has at least one transmit port and one receive port. The transmit port is used to transmit a sequence of bits or words on a network path. This sequence is received on the receive port and used to determine the number of errors that occur on a particular path. After these errors are identified, problematic connections within a network may be located. For example, device failures or malfunctions may be identified on the network by looking at the number of errors on a particular path on the network. In response to these detected errors, network devices and components may be adjusted or replaced.

A network path is shown that begins at the bit error rate tester 100 and crosses multiple networking devices before returning to the bit error rate tester 100. Specifically, the bit sequence travels through a first networking device 110 and a second device 120 along this particular network path. These devices operate based on protocol (e.g., network protocol) specific traffic and may insert idles or filler words within the sequence in order to maintain the synchronization or integrity of the sequence. An example of these networking devices 110, 120 is a repeater or regenerator. The inserted idles or filler words alter the bit sequence resulting in the inability of conventional bit error rate testers to measure this path. The network node 130 may be any device that can return the bit sequence to the bit error rate tester 100. For example, the network node 130 may be a router, switch or bridging device. It is also important to note that this node 130 may also insert idles within the bit or word sequence.

The present invention provides an additional layer of intelligence that allows it to detect idles or filler words within the sequence. The bit error rate tester 100 removes the idle words from the sequence before performing an error detection analysis. Additionally, the detection of idles allows the bit error rate tester to identify when the received sequence is not synchronized and resynchronize it. Accordingly, a received bit sequence that is not synchronized may be resynchronized and used to determine errors. Comparatively, traditional bit error rate testers cannot operate in environments where idles and fill words are added or dropped from the bit sequence.

a) Control and Interfaces of Bit Error Rate Tester

Figure 2:
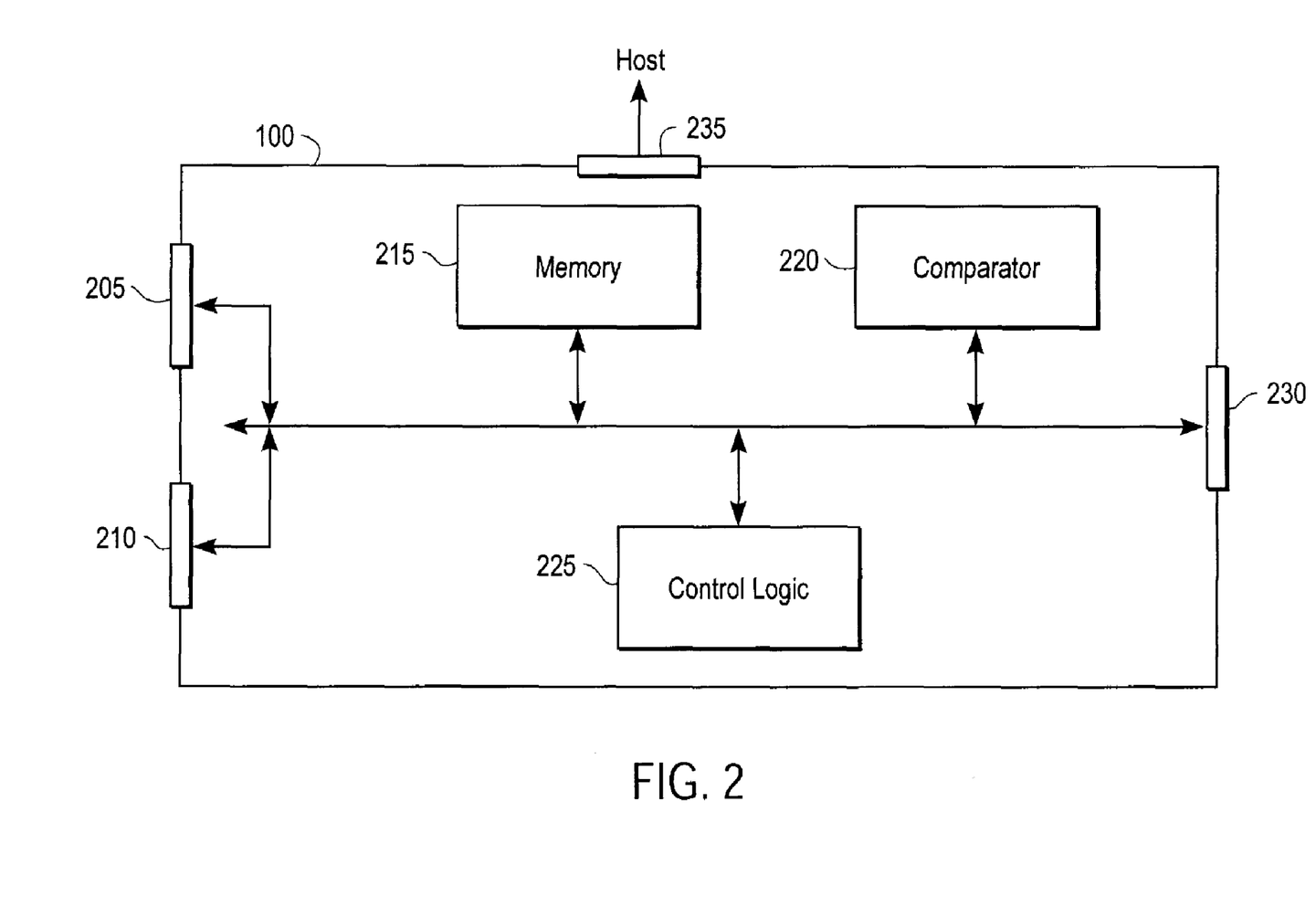
FIG. 2 is a general block diagram of a bit error rate tester according to an embodiment of the invention.

FIG. 2 illustrates an embodiment of a bit error rate tester including interfaces and general components according to the present invention. The bit error rate tester 100 includes multiple interfaces on which data may be received and transmitted. A first interface 205 may be a 300 pin XBI interface, an optical or electrical based interface. A second interface 210 may be a direct serial port, an electrical serial interface or a 10 Gbps serial (XFP) optical or electrical port. A third interface 230 may be a XENPAK port, a 10 Gigabit Ethernet interface. Finally, a fourth interface 235 is a host connection that allows the bit error rate tester 100 to be controlled by a host. For example, a computer operating Windows 2000™ may be used to control and analyze data from the bit error rate tester 100. This fourth interface may be a serial port, such as a USB or R232 connection, or a parallel port.

The multiple interfaces allow the bit error rate tester 100 to operate in multiple modes. For example, the bit error rate tester 100 may operate in an optical/electrical mode by transmitting a bit sequence from a fiber optic port (e.g., XBI port) and receiving the return bit sequence on an electrical port. Accordingly, the bit error rate tester 100 may operate within various different networks and along various different paths on the network.

The multiple interfaces also allow a higher level of flexibility in the creation and detections of sequence bits that may be used by the bit error rate tester 100. The bit stream created from the XBI and direct serial ports may be user defined or a pseudo-random bit sequence. Comparatively, the bit stream generated from a XENPAK port is 10 Gigabit Ethernet traffic, but may include user-defined patterns of idles, frames and words.

The XBI interface and direct serial port allow traffic sent by the bit error rate tester 100 to be looped through a cable with or without attenuation in order to test the transmit and receive side integrities of the XBI module, fiber or any other physical layer device at the serial interfaces 205, 210. The XENPAK interface allows the traffic sent by the bit error rate tester 100 to a XAUI module through a XAUI parallel interface and looped to the serial interface of the XAUI module in order to test the integrity of the XAUI module or any other device attached to the XENPAK module.

The four interfaces 205, 210, 230, 235 are coupled to components within the bit error rate tester 100. For example, a bus may be connected to each of the interfaces that allows data to travel to components in the bit error rate tester 100. These components include a memory device 215, a comparator 220, and control logic 225. A RAM module is an example of a memory device 215 that may be deployed within the bit error rate tester 100. The comparator 220 comprises digital logic that allows the comparison of a received bit sequence to a copy of the bit sequence when it was transmitted. The comparator 220 determines errors within the received bit sequence and calculates a bit error rate. Control logic 225 is coupled to the bus so that it may control the interfaces and components within the bit error rate tester 100. This control logic 225 may comprise a variety of different digital circuitry. In one embodiment, the control logic contains FPGAs that allow easy upgrading of the circuit logic to adapt to protocol modifications or rate increases.

b) General Description of Bit Error Rate Tester

Figure 3A:
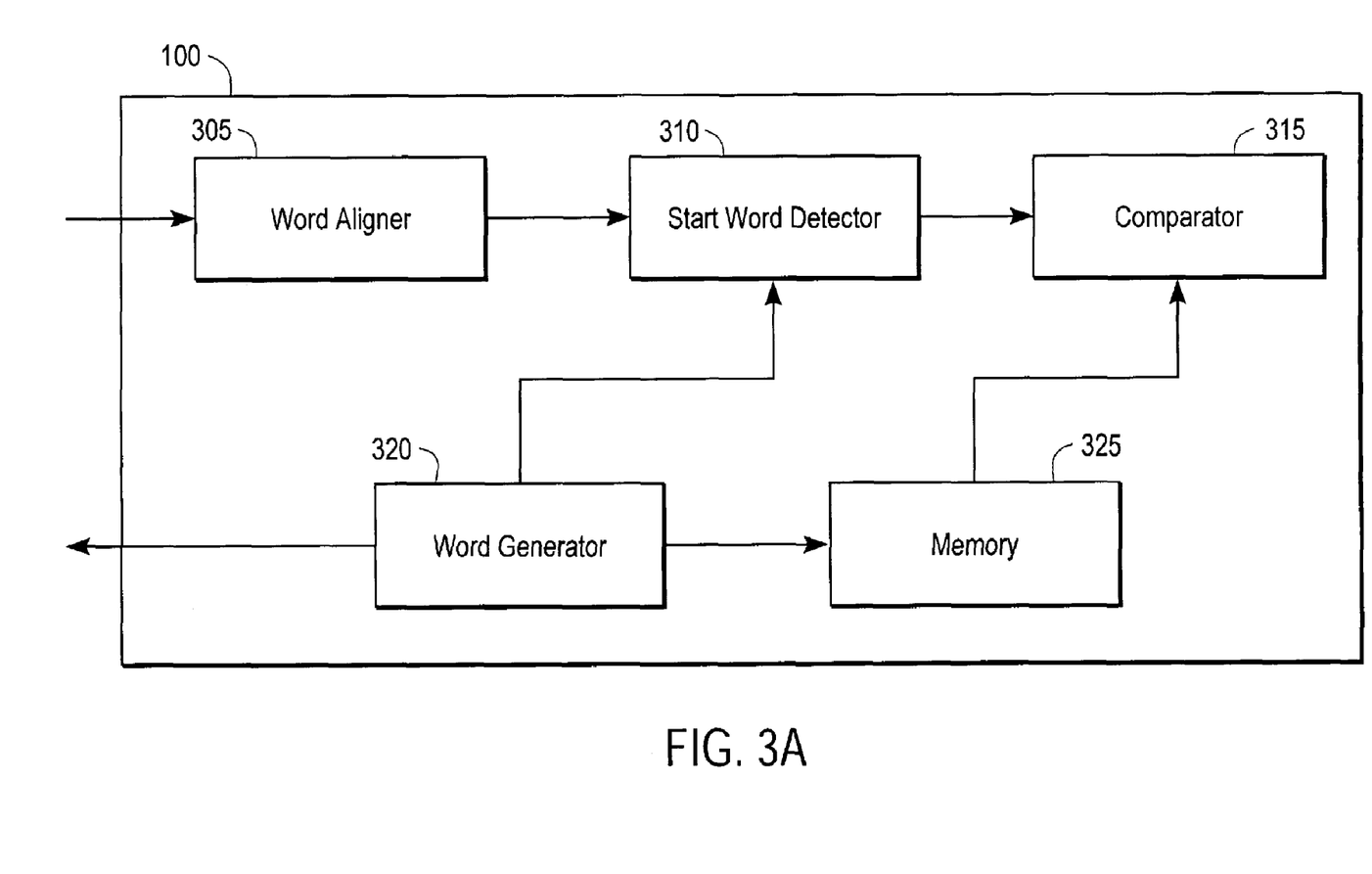
FIG. 3A is a general component diagram of a bit error rate tester according to an embodiment of the invention.

FIG. 3A is a general block diagram of a bit error rate tester according to an embodiment of the invention. The bit error rate tester 100 comprises a word generator 320 that generates a bit sequence that is generated using pre-stored data within a memory 325 prior to any transmission, and subsequently transmits the bit sequence onto a network. The bit error rate tester 100 also comprises a word aligner 305 that receives a bit sequence from the network. The bit sequence may have been deserialized or demultiplexed prior to being received at the word aligner 305. The bit sequence is forwarded from the word aligner 305 to the start word detector 310 that determines a start word in the bit sequence and may also identify an end word. This start word and end word detection is important so that the comparison of the received bit sequence to a regenerated bit sequence using the pre-stored data in the memory is synchronized. After the start word is determined, the bit sequence is transmitted to a comparator 315 where the actual comparison occurs and errors are detected. These components are described in more detail below.

The word generator 320 creates a bit sequence or word pattern that will be used for testing the error rate of a network path. Typically, error detection employs looping where the same bit sequence or word pattern is transmitted on the path repeatedly over time. The created bit sequence or pattern is then inserted within a data stream onto the network. The user-defined bit sequence may include one or more placeholders. A placeholder is a code that commands the insertion of a dynamically-generated data word into the bit sequence. Depending on the type of placeholder, these data words may be PRBS based generated random numbers, incrementing words, incrementing bytes, walking ones and zeros, all ones and zeros, or other types of dynamically generated data. For example, the bit sequence or word pattern may be in a XGMII/MAC word pattern, an enhanced MAC interface from the 10 Gigabit Ethernet Protocol. Additionally, a raw pattern may be used if the XBI module, direct serial port, or XFP module is used. These defined placeholders may be filled by the word generator 320 using random words, incrementing words, incrementing bytes, walking ones and zeroes, or all ones or zeroes. Additionally, the bit error rate tester 100 can take advantage of the automatic checksum ('CRC') insertion. The automatic CRC insertion is useful whenever there is any placeholder in the predefined data patter (e.g., a random number, an incrementing value, walking ones and zeros, etc.) because the data generated by that placeholder changes every loop, even though the data in the memory remains the same. The host software can't precompute the CRC in the memory in these cases, so the hardware CRC becomes necessary.

As mentioned above, the bit sequence is generated using pre-stored data within the memory 325. It is this pre-stored data that will be used to regenerate the bit sequence from which errors in the bit sequence received from the network path may be identified. Also, a user may also assist in the creation of bit sequences or patterns using the attached host. A graphical user interface on the host will allow the patterns to be saved and reused. For example, some of these functions on the GUI may include a word length selector, placeholder definition, a specific packet/frame selector for jitter measurements, a copy/paste/cut option and a CRC control command. Thereafter, the GUI may display a count of mismatched bits, a count of mismatched words, bit error rate calculation, elapsed time and total number of compared bits, elapsed time and number of bits since last error, and a count of the number of detected loops with at least one error.

The word aligner 305 receives the bit sequence from the network and makes sure that the sequence is synchronized. Specifically, the word aligner 305 will provide an intelligent re-synchronization that will allow an out-of-sync bit sequence to be synchronized without having to re-seed and re-transmit the bit sequence. Thus, lost or corrupted bits within the sequence or clocking errors in the sequence may be identified allowing the bit sequence to be realigned. This realignment occurs by recognition of idles or fill words within the data stream. The word aligner 305 can recognize these idles and realign the next bit sequence using the start word on that sequence. As mentioned above, idles are typically added or dropped as the bit sequence travels along the network path. Conventional bit error rate testers are unable to compensate for these idles, thereby preventing them from detecting the bit error rate on that particular path. In this particular embodiment, once the received bit sequence is determined to be synchronized, the word aligner 305 activates the comparator 315.

The use of idle or filler word detection provides improved synchronization and allows the bit error rate tester 100 to operate on a much broader network scale and provides realignment functionality in case the bit sequence is not synchronized at reception. The detection of idles and fill words also allows the bit error rate tester 100 to overcome clock differences resulting from clock conversions between network devices (e.g., XAUI clock to reference clock) and corrupted or discarded bits within the bit sequence that may cause loss of synchronization.

The start word detector 310 is used to identify a start word of a word pattern that was created by the word generator 320. Specifically, the start word detector 310 is adapted to identify this start word of a word pattern by identifying a defined value(s) for start words in a bit sequence. The start word detector 310 may also identify end words in the bit sequence so that the bit error rate detector 100 may know when to stop comparisons. The start word detector 310 identifies the start of the bit sequence so that the comparator 315 may compare the received bit sequence to the sequence stored in the memory 325. For example, in a 10 Gigabit Ethernet embodiment, the 10 Gigabit Ethernet protocol may have defined start word patterns that the start word detector 310 may identify in order to find a start word within a data stream. The end word, within the data stream, will be identified so that the end of the word is identified and idles are not included in the comparison. As a result, the bit sequence within the 10 Gigabit Ethernet data stream can be identified from start to end. Once the start word is identified, the bit sequence is transmitted to the comparator 315, and after the end word is identified, the comparison stops. Thus, the comparison occurs only on bits between a start word and an end word.

The comparator 315 determines the bit error rate of a particular network path using the received bit sequence. As mentioned above, the received bit sequence is compared to the bit sequence that was generated using pre-stored data in the memory 325, thus allowing the bit sequence to be regenerated at the receiver. The comparator 315 counts the number of errors within the bit sequence. A bit error rate is actually calculated by counting the number of errors within a number of bits. In one embodiment, the comparison may be momentarily disabled in order to improve the accuracy of the error count. For example, if a received bit sequence is not synchronized, the comparator 315 may be deactivated in order to prevent erroneous bit error rate calculations. The comparator 315 may also transmit these error counts to host software that interprets these error counts and signals a network manager when a bit error rate exceeds a preselected level. For example, a bit error rate of $10^{-6}$ bit errors/second or $10^{-3}$ bit errors/second may be thresholds on which a network manager is identified. These thresholds may represent major problems within the network such as a failing device or cut fiber.

Figure 3B:
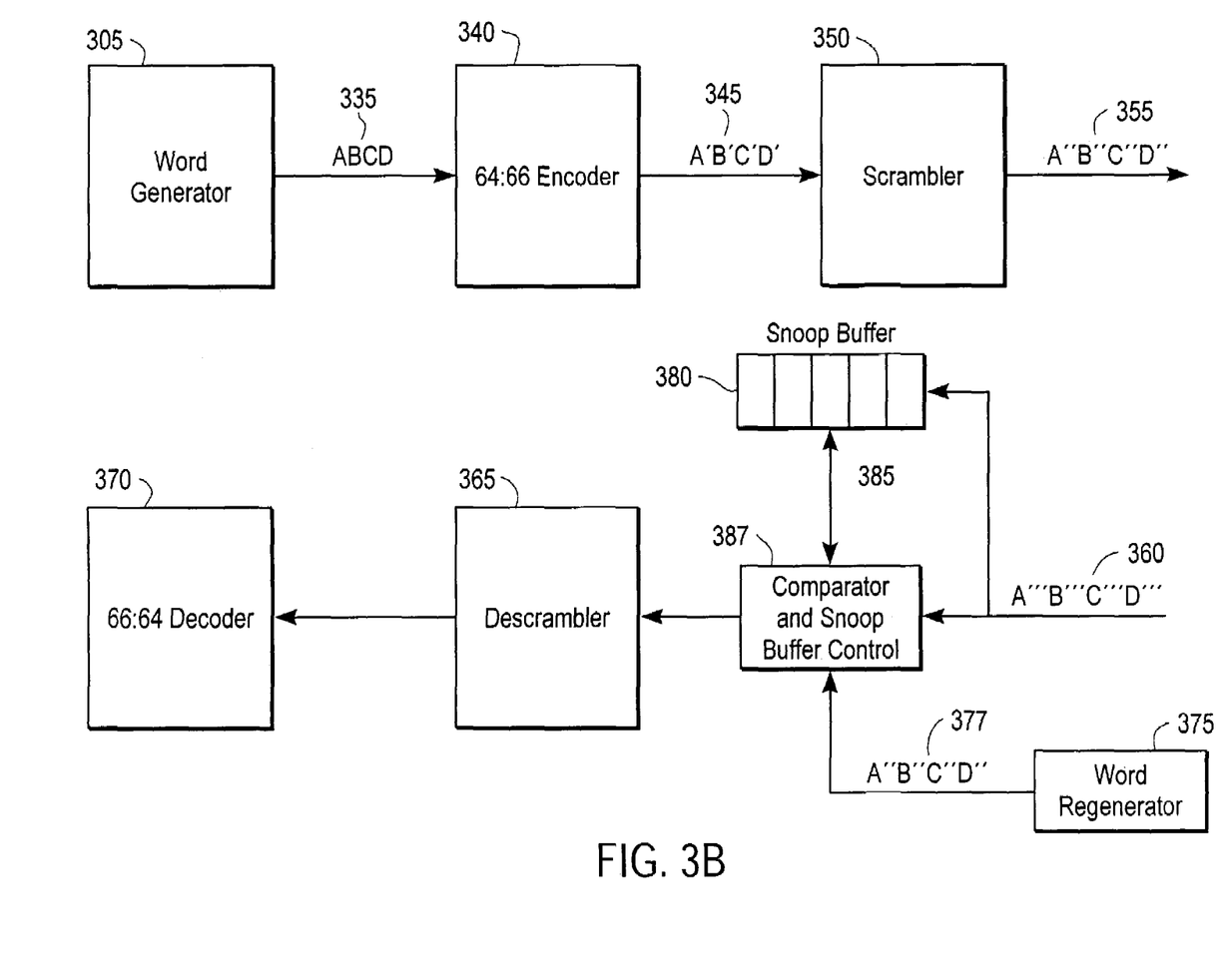
FIG. 3B is a component diagram showing test points along a data path for a bit error rate according to an embodiment of the invention.

In one embodiment, the bit error rate tester 100 is able to provide error rate measurement at bit granularity. In particular, it is desirable that the bit error rate tester 100 is able to measure bit errors using a bit-to-bit comparison even on data paths that include data altering components such as encoders and scramblers. This bit granularity measurement allows the bit error rate tester 100 to operate on high-speed networks (e.g., 10 Gbps) using protocol specific traffic. FIG. 3B generally illustrates an example of bit error rate measurement at bit granularity according to one embodiment of the invention.

According to this embodiment, the word generator 305 generates a bit sequence represented by sequence ABCD 335. As described above, this bit sequence 335 may be a PRBS or other type of sequence used to test a path. Prior to transmission onto a network, the bit sequence 335 travels along a path having a plurality of components within the bit error rate tester 100. In this example, the bit sequence 335 is transmitted to a 64:66 encoder 340 that alters the bit sequence 335 to a second bit sequence $A'B'C'D'$ 345. This second bit sequence 345 is transmitted to a scrambler 350 that alters the second bit sequence 345 to a third bit sequence A″B″C″D″ 355. This third bit sequence 355 is then transmitted onto a network data path to test the integrity of that path.

The third bit sequence 355 returns to the bit error rate tester 100 as a return bit sequence A‴B‴C‴D‴ 360. This returning bit sequence 360 should match bit-to-bit to the third bit sequence 355 once idles are removed. However, if errors are within the return bit sequence 360, these errors may further alter the bit sequence as it travels through components on the receive path. For example, the return bit sequence 360 travels through a descrambler 365 and 66:64 decoder 370 that would further amplify an error or errors within the return bit sequence 360. Specifically, the descrambling and decoding of a return bit sequence, having an error, may result in further errors being generated in the bit sequence and may not provide the error bits sharply and clearly to a comparator. These additional errors from descrambling and decoding would be identified during an error detection measurement and erroneously attributed to the network path that is being tested. Accordingly, bit error calculations may not be performed using the first bit sequence 355 if bit error measurements of the true received bits at bit granularity are desired. This problem is particularly significant in high data rate networks where bit sequence altering components are used within the bit error rate tester 100. One skilled in the art will recognize that a 64:66 encoder, scrambler, descrambler, and 66:64 decoder are defined and described within the 10 Gigabit Ethernet protocol.

According to one embodiment of the present invention, a word regenerator 375, within the receive path, regenerates the third bit sequence 355 and transmits it to a comparator 387. The comparator 387 receives the return bit sequence 360 and compares it to the regenerated third bit sequence 355. This comparison occurs bit-to-bit resulting in bit granularity error measurements. Thereafter, a bit error rate may be calculated using the detected bit errors.

Figure 3C:
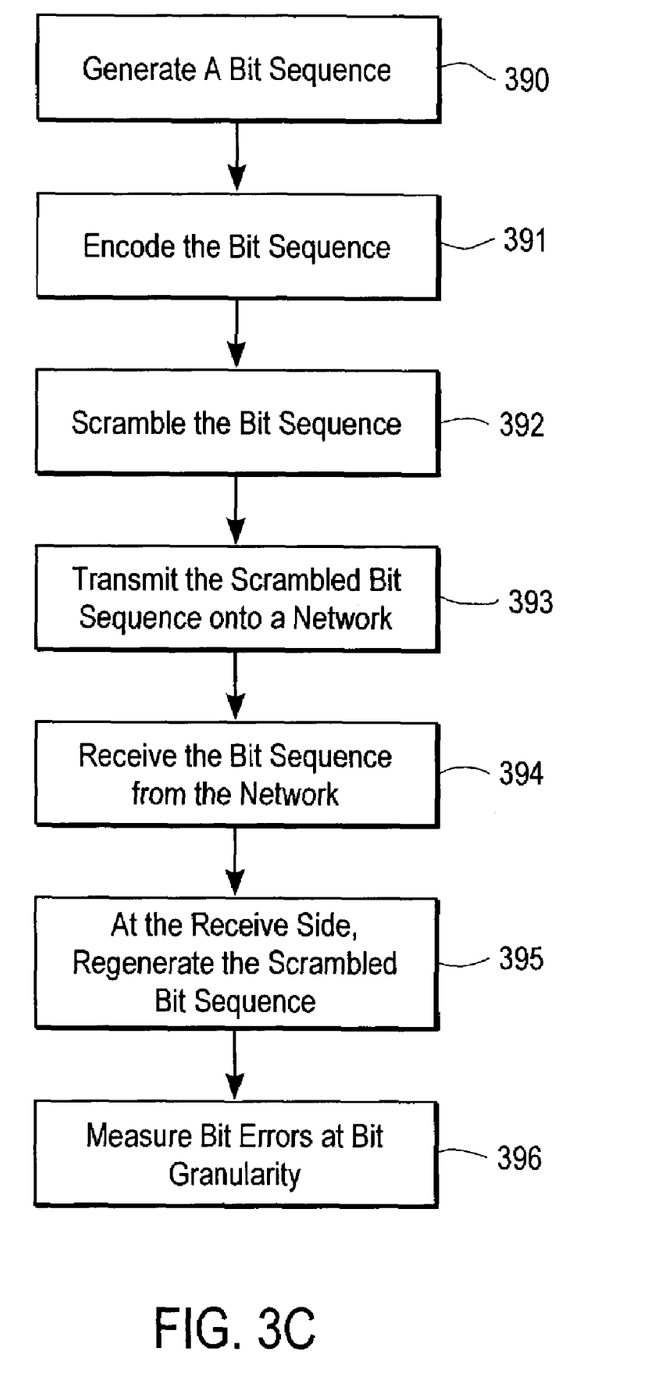
FIG. 3C is a flowchart illustrating a bit error rate testing method at bit granularity according to an embodiment of the invention.

FIG. 3C is a flowchart illustrating a bit error rate testing method at bit granularity according to an embodiment of the invention. First, a bit sequence, such as a PRBS, is generated 390. This bit sequence is encoded 391 and scrambled 392 prior to transmission onto a network path. Thereafter, the bit sequence is transmitted 393 onto a network path and is received 394 by the bit error rate tester 100 after traveling the path. The encoded and scrambled bit sequence is then regenerated 395 at the receive side of the bit error rate tester 100. The bit error rate tester 100 measures 396 the number of bit errors at bit granularity by comparing, bit-to-bit, the received bit sequence to the regenerated bit sequence. Thereafter, a bit error rate may be calculated using these measurements.

The present invention includes a snoop capability that provides data relating to and/or surrounding a detected error to be stored and provided for later analysis. In one embodiment, a copy of the received bit sequence 360 is stored within a snoop buffer 380 used to store and provide data in the event an error is detected. An example of one possible snoop buffer 380 is a FIFO buffer. Once an error is detected by the comparator 387, a snoop buffer control may request that particular data within the snoop buffer 380 be stored for later analysis of the detected error. Additionally, control information may be stored to provide more analysis information to a user.

The snooping capability also allows for relevant data to be stored when a particular triggering event occurs during bit error measurements. For example, a bit miscomparison between the third bit sequence 355 and the return bit sequence 360 may be such a triggering event. Another example of a triggering event may be the bit error rate crossing a particular threshold (e.g., $10^{-12}$ errors/second or $10^{-9}$ errors/second). These triggering thresholds may be integrated within a bit error rate tester or defined by a user. Once a triggering event occurs, the data (i.e., return bit sequence 360) within the snoop buffer 380 is stored and provided for analysis. For instance, all of the data stored within the snoop buffer 380 surrounding an error bit may be stored so that details relating to the error may be analyzed. Other characteristics of this snoop and capture feature may also be defined by the user. For example, a capture may be storing all traffic within the buffer, storing only mis-compared words, stopping upon a specific word with a trigger-out option, stopping upon a mis-compare with trigger-out option, or stopping upon trigger-in.

The above-described bit error measurement at bit granularity and snoop and capture features allows the bit error rate tester 100 to operate on various types of networks having different data rates. Specifically, the bit error rate tester 100 may operate on high rate networks such as 10 Gbps Ethernet networks on which conventional bit error rate testers would not function properly.

c) Specific Description of the Bit Error Rate Tester

Figure 4A:
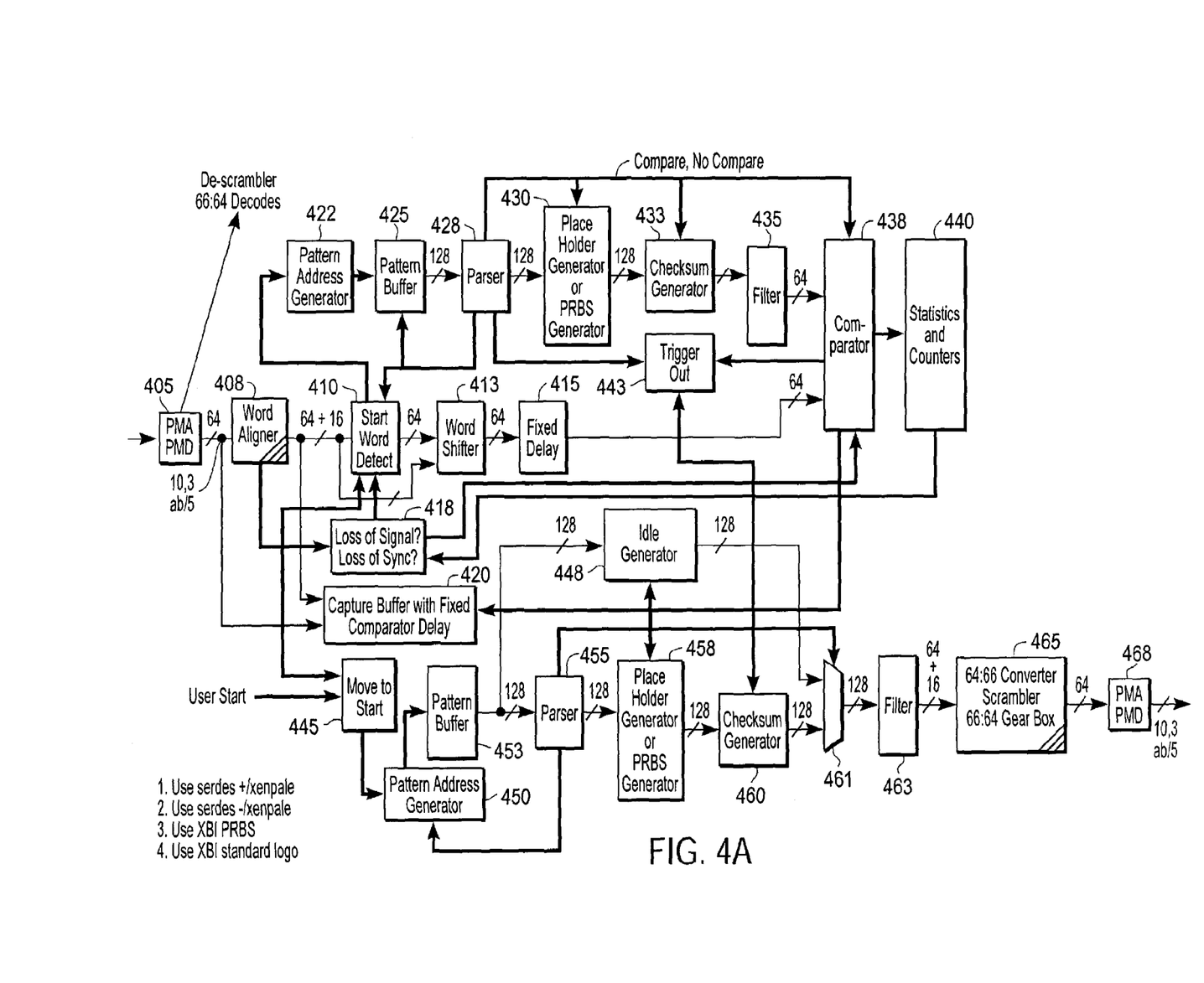
FIG. 4A is a specific component diagram of a bit error rate tester according to an embodiment of the invention.

FIG. 4A illustrates one embodiment of a bit error rate tester 100 operable at high bit rates (10 Gigabits and higher) according to the present invention. This figure includes a detailed description of the data flow through the bit error rate tester 100. The bit error rate tester 100 is activated by a user providing some input 445 such as pressing a button or typing a command on a command line interface. A pattern address generator 450 provides a correct pattern address to the pattern buffer 453. The pattern buffer 453 provides the pattern per clock to a parser 455. Based on the parser results, different choices may be made (e.g., injecting idles, using place holders, etc.). The parser 455 also gives the address generator 450 the command to generate the correct address based on the stored control bits within the pattern buffer 453. Whether a placeholder generator or PRBS generator is used depends on the actual system implemented in the bit error rate system. For example, if the bit sequence is pseudo-random then a PRBS generator will be used. Control bits from the pattern buffer 453 are sent to an idle generator 448 that will generate idles or fill words that will be inserted in between bit sequences prior to transmission onto the network. It is important to note that other networking devices on the path may modify these idles by dropping some of them or adding more in order to maintain synchronization of the data stream.

A checksum generator 460 adds a checksum to the bit sequence generated by the placeholder generator/PRBS generator 458. The multiplexer 461 multiplexes the idles generated by the idle generator 448 and the bit sequence into a single data stream. Thereafter, a filter 463 removes any additional buffer control bits so only the data bits are passed to the convertor/scrambler 465 and PMA/PMD 468. It is important to note that both the bit sequence and checksum are transmitted to the receiver side of the bit error rate tester 100.

The bit sequence travels along the network path and returns on an interface on the bit error rate tester 100. A PMA/PMD attachment 405, a line termination device, receives the bit sequence and forwards it on to a word aligner 408. The word aligner 408, as described above, ensures that the bit sequence is synchronized. If the bit sequence is not synchronized, then the word aligner 408 will resynchronize the bit sequence. As a result, synchronization errors can be fixed without having to re-seed the bit sequence and re-transmit it on the network. The word aligner 408 determines 418 if the signal has been lost (i.e. loss of light) or synchronization has been lost, and if so, deactivates the comparator 438. The word aligner 408 forwards the received bit sequence to the start word detect module 410 in order to determine the start word of the bit sequence or word pattern. Once the start word has been identified, the bit sequence is forwarded to a word shifter 413 and delay module 415. The word shifter 413 ensures that bit sequence is properly aligned within the bit error rate's internal path. According to one embodiment, the word shifter 413 aligns a 32 bit entity (e.g. XENPAK MAC word) to a 64 bit internal data path. The delay module 415 delays the received bit sequence a sufficient amount of time to match the delays of the modules that regenerate the transmitted bit sequence. As a result, both the received bit sequence and the regenerated bit sequence arrive at the comparator 438 at the same time. This regenerated bit sequence is regenerated from a memory bank and corresponding logic modules shown in detail. In this example, the transmitted bit sequence is regenerated by a pattern buffer 425, a parser 428, a place holder generator or PRBS generator 430, a check sum generator 433, and a filter 438.

The comparator 438 compares the received bit sequence to the bit sequence regenerated in the memory bank. From this comparison, a statistics and counter module 440 calculates a bit error rate. Bit errors are accumulated to measure the bit error rate on a particular network path. This calculation may be a simple calculation or an average bit error rate. Also, the statistics and counter module 440 provide other data to the user through the host GUI as described above.

In the above-described example, the bit sequence was generated and transmitted from a first bi-directional port and received on a second bi-directional port. Thus, the bit sequence generation and memory channel on the receive port are different than the one actually used to generate the bit sequence. The word aligner 408, the start word detect module 410, and the comparator 438 are supplied relevant information (e.g., actual bit sequence, start word, checksum) from host software so that proper bit error rate detection can occur. The bit error rate tester 100 may also include other features that enable other types of measurements or error detection characteristics listed below. For example, it may provide 8B/10/B conversions, standard jitter patterns, arbitrary pattern entry, and for network devices that transmit and receive data on multiple parallel serial channels ('lanes'), the bit error rate tester may provide different patterns per lane, adjustable lane to lane delay, and the ability to test each lane individually. Also, the bit error rate tester 100 may provide an adjustable speed and frame size feature, and compare different lanes out to different lanes in. The bit error rate tester 100 may also have an adjustable power source for both XBI and XENPAK modules at all levels, MDIO support for the XENPAK module, and provide (low delay) SMA based in/out triggering (pattern clock or trigger on error). As noted above, the bit error rate tester may interface with various types of networks including WANs, LANs, and SANs.

Figure 4B:
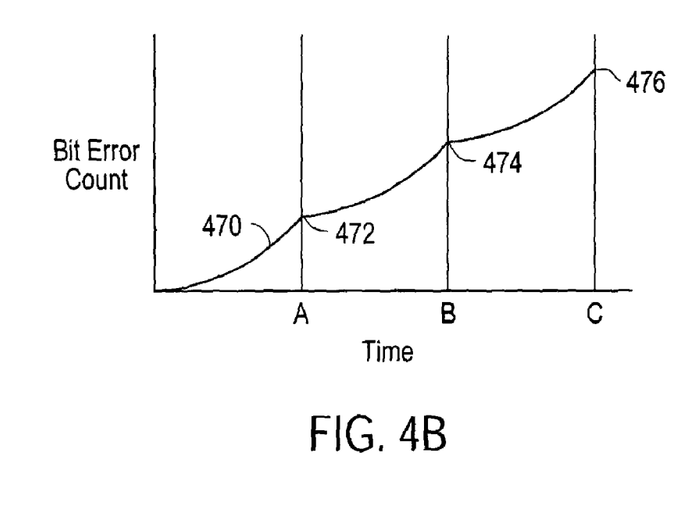
FIG. 4B is a graphical representation of a relationship of a bit error count versus time according to an embodiment of the invention.

The intelligent resynchronization may be used in different ways to facilitate accurate bit error rate measurements. FIG. 4B is an exemplary plot of a bit error count 470 over an extended period of time. One will recognize that this line 470 is not linear; rather, as the slope of the line increases above a particular rate indicative of the occurrence of a triggering event, resynchronization (e.g., 418) occurs in the bit error rate tester 100 and the measured error rate decreases. In this particular example, a first triggering event 472 at time A occurs resulting in resynchronization that reduces the slope on line 470 immediately following the event 472. Data relating to this first triggering event 472 may be captured and stored for later analysis depending on the characteristics of the snoop and capture feature described above. A second triggering event 474 at time B and a third triggering event 476 at time C are shown. Similar to the first triggering event 472, the bit error rate tester 100 is resynchronized and data relating to both events 474 and 476 are captured. A log is generated that describes each triggering event and resynchronization so that a user may analyze each event. This feature allows a user to test the integrity of a path of a long period of time to get a more accurate measurement of a corresponding bit error rate.

Figure 4C:
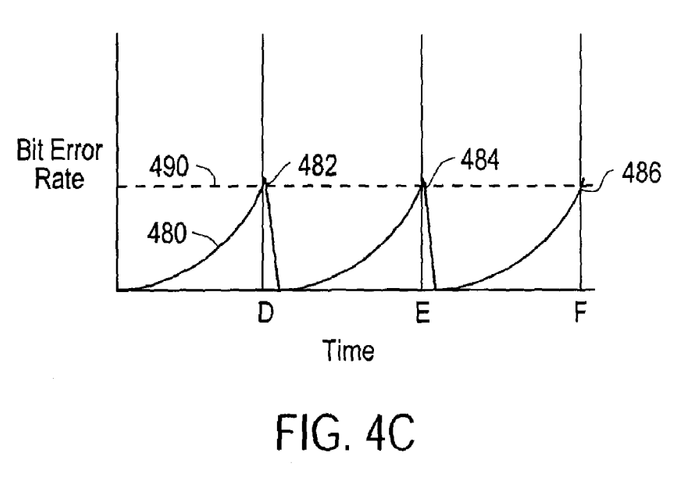
FIG. 4C is a graphical representation of a relationship of a bit error rate versus time according to an embodiment of the invention.

FIG. 4C is an exemplary above plot of a bit error rate 480 over an extended period of time. A first triggering event 482 at time D is shown where the bit error rate 480 crosses the threshold 490 resulting in resynchronization. Immediately after resynchronization, the measured bit error rate 480 decreases and data relating to the first triggering event 482 is captured. As described above, the type of data stored may be defined by the user. A second triggering event 484 at time E and a third triggering event 486 at time F are also shown. Similar to the first triggering event 482, resynchronization occurs after events 484 and 486, and data relating to these events 484, 486 may be captured and stored.

One will recognize that the above-described examples are meant to be exemplary and that there are many different embodiments of intelligent resynchronization and snoop/capture functions.

d) Method for Determining Bit Error Rate on a Network Path

Figure 5A:
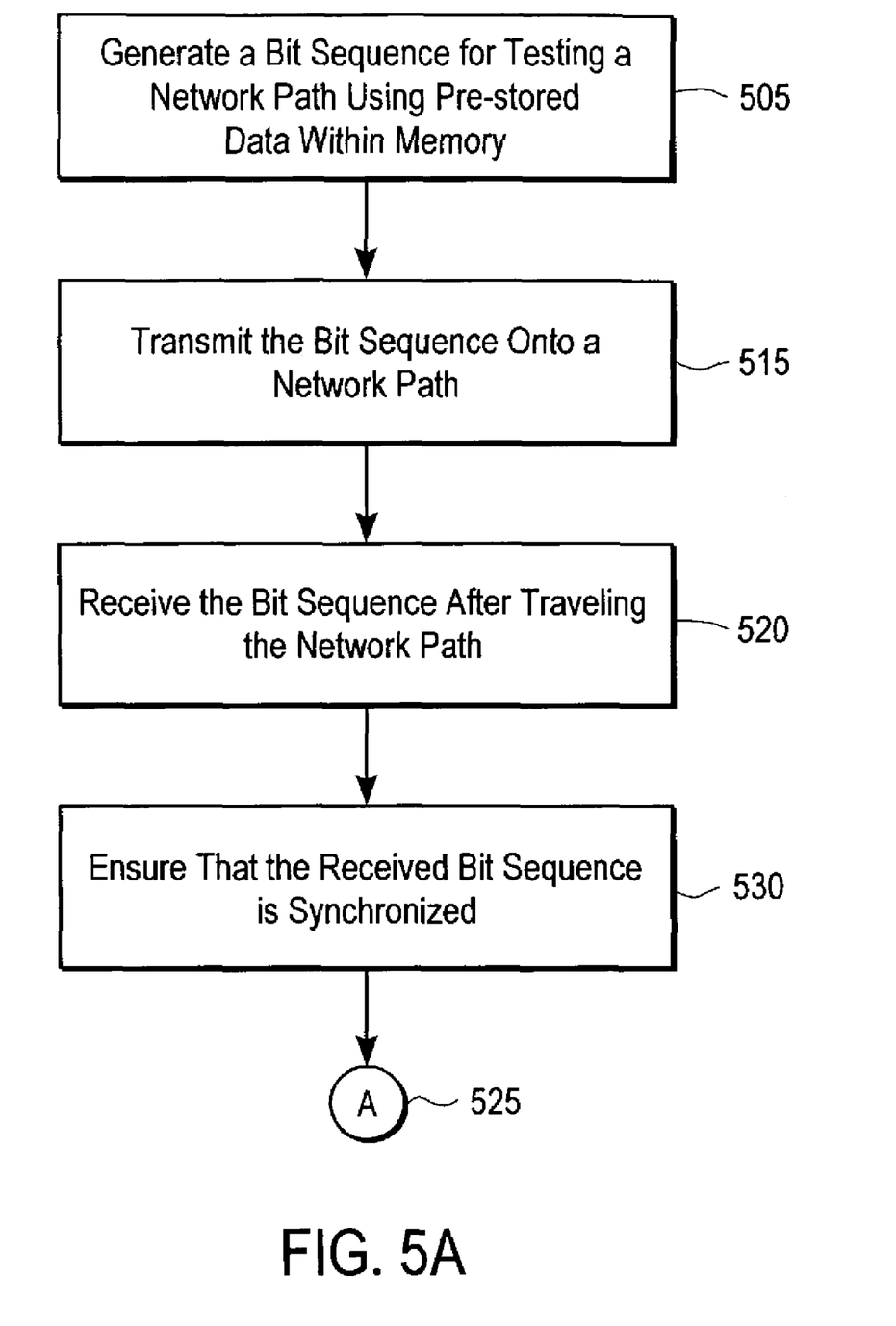
FIGS. 5A and 5B are flowcharts describing a method for testing bit error rates on a network path.
Figure 5B:
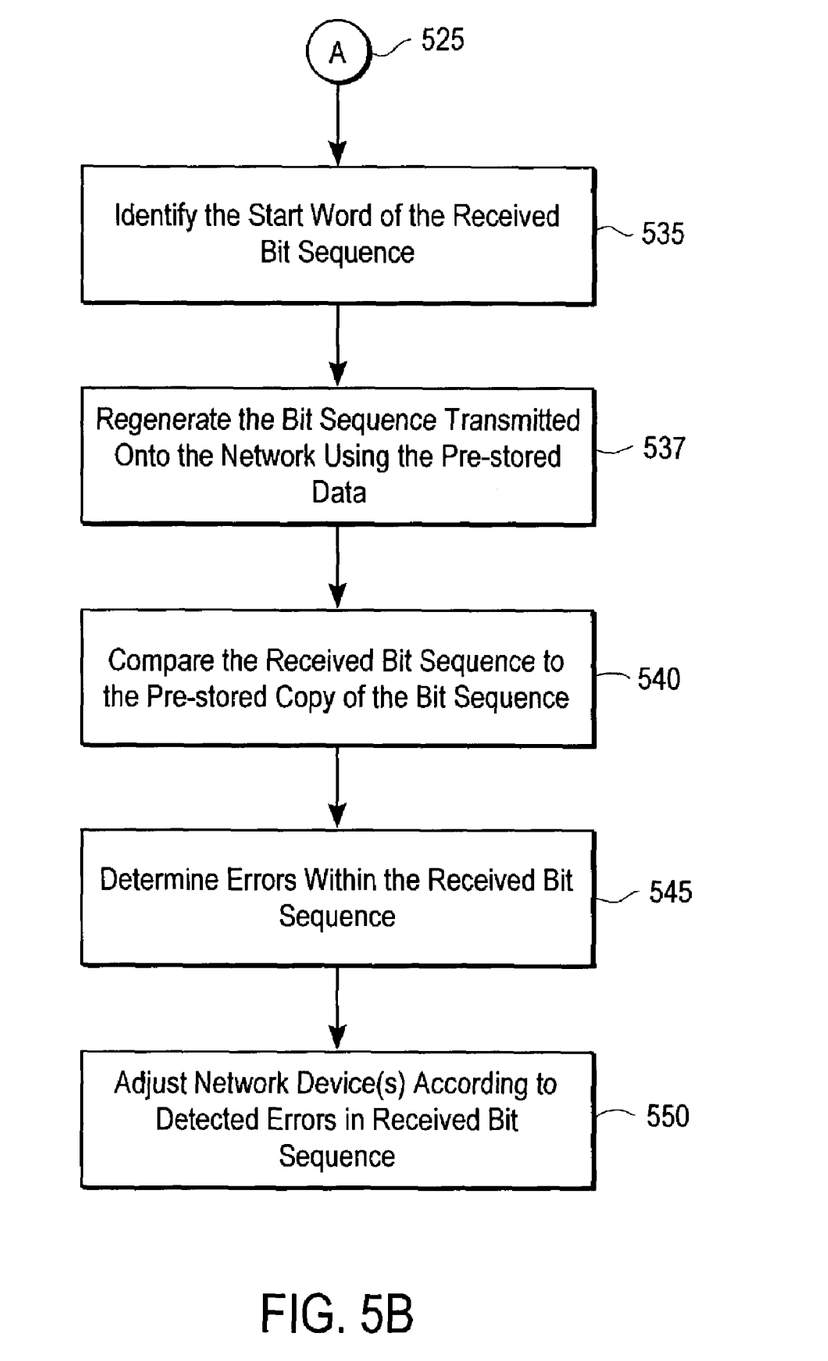

FIGS. 5A and 5B illustrate a method for calculating a bit error rate for a particular network path. The first step in the method is generating 505 a bit sequence as described above. This bit sequence may be user-defined, pseudo-random, random or incremental. Also, placeholders may be defined within a data stream in which the bit sequences are inserted. This process may continue with the same bit sequence (looping) or different bit sequences may be used. This bit sequence is generated using pre-stored data within a memory device that will also be accessed on the receive side to regenerate the bit sequence.

The bit sequence is transmitted 515 onto a network path from a port on the bit error rate tester. The bit sequence will travel on physical transmission media (e.g., fiber, cable, etc.) and have events occur that will misshape, corrupt or destroy certain portions of the sequence. For example, an optic signal will disperse as it interacts with optical fiber. This dispersion degrades the signal (lowering signal-to-noise ratio) often resulting in errors once the signal is received. Additionally, network devices on the path may cause errors to occur within the bit sequence. After the bit sequence has traveled the path, it is received 520 by the bit error rate detector at a particular port. A flow chart connector 525 is shown to connect the flowcharts FIGS. 5A and 5B.

Once the bit sequence is received by the bit error rate detector, a check is performed to ensure 530 that the sequence is synchronized. If it is not synchronized, then the comparison procedure is halted and the sequence is re-synchronized. Thereafter, the start word of the received sequence is identified 535. This allows the bit error rate tester to perform a proper comparison and determine the bit error rate. This identification occurs because the start word is identified within the network protocol (e.g., 10 Gigabit Ethernet) in which the bit error rate tester is operating. The bit sequence transmitted onto the network is regenerated 537 at the receive side. The received bit sequence is compared 540 to the regenerated bit sequence that was transmitted onto the network. A bit-by-bit comparison is performed so that errors are identified 545 within the received bit sequence. This bit granularity measurement allows the bit error rate tester to accurately count the number of bit errors within a particular bit sequence. This number of errors is then integrated over a period of time in order to identify an average bit error rate for the particular network path on which the bit sequence traveled. Once the characteristics of the errors are analyzed, changes 550 may be made to devices on the path in order to improve performance. For example, the optical characteristics may be changed or a repeater may be repaired in order to make sure a network path is operating properly.

While the present invention has been described with reference to certain preferred embodiments, those skilled in the art will recognize that various modifications may be provided. Variations upon and modifications to the preferred embodiments are provided for by the present invention, which is limited only by the following claims.

We claim:

1. An apparatus for measuring the bit error rate along a particular network path, the apparatus comprising:
   a first port that transmits a bit sequence onto a network at a rate above 3 Gigabits per second;
   a second port that receives the bit sequence from the network;
   a word aligner, coupled to receive the bit sequence from the second port, that ensures that the received bit sequence is synchronized;
   a start word detect module, coupled to receive the bit sequence from the word aligner, that identifies a start word in the received bit sequence; and
   a comparator, coupled to receive the bit sequence from the start word detect module, that calculates a bit error rate from the received bit sequence.

2. The apparatus of claim 1 wherein the network operates at a rate equal to or higher than 9.9 gigabits/second.

3. The apparatus of claim 2 wherein the network operates according to a protocol selected from a group consisting of Ethernet, Fibre Channel, ISCSI, SONET and Asynchronous Transfer Mode.

4. The apparatus of claim 1 wherein the first port comprises an interface selected from a group consisting of a XBI interface, a direct serial interface, and a XENP AK interface.

5. The apparatus of claim 1 wherein the second port comprises an interface selected from a group consisting of a XBI interface, a direct serial interface, and a XENP AK interface.

6. The apparatus of claim 1 further comprising a host interface that transmits data to and receives data from a host.

7. The apparatus of claim 1 wherein the host interface is an interface selected from a group consisting of an RS232 interface and a USB interface.

8. The apparatus of claim 1 further comprising:
   a bit sequence generator, coupled to transmit data on the first port, that generates a bit sequence used for detecting an error rate on a data path; and
   a bit sequence regenerator coupled to regenerate the bit sequence so that errors may be identified within received bit sequence.

9. The apparatus of claim 8 wherein the bit sequence generator generates a pseudo-random bit sequence.

10. The apparatus of claim 8 wherein the bit sequence generator generates an incremental bit sequence.

11. The apparatus of claim 8 wherein the bit sequence generator generates a user-defined bit sequence.

12. The apparatus of claim 1 wherein the word aligner deactivates the comparator when an unsynchronized bit sequence is detected.

13. The apparatus of claim 1 wherein the word aligner re-synchronizes the bit sequence using idles embedded within the bit sequence that was received from the second port.

14. A method for detecting bit error rate within a network path, the method comprising the steps of:
   generating a bit sequence;
   transmitting the bit sequence onto a network at a rate higher than 3 Gigabits per second;
   receiving the bit sequence from the network;
   ensuring the received bit sequence is synchronized;
   identifying a start word within the received bit sequence; and
   comparing the received bit sequence to a regenerated bit sequence in order to identify errors in received bit sequence.

15. The method of claim 14 wherein the network operates at a rate equal to or higher than 9.9 gigabits/second.

16. The method of claim 14 wherein the network operates according to a protocol selected from a group consisting of Ethernet, Fibre Channel, ISCSI, SONET and Asynchronous Transfer Mode.

17. The method of claim 14 wherein the bit sequence is transmitted onto the network via an interface selected from a group consisting of a XBI interface, a direct serial interface, and a XENP AK interface.

18. The method of claim 14 wherein the bit sequence is received from the network via an interface selected from a group consisting of a XBI interface, a direct serial interface, and a XENP AK interface.

19. The method of claim 14 wherein the first bit sequence is generated pseudo-randomly.

20. The method of claim 14 wherein the first bit sequence is generated incrementally.

21. The method of claim 14 wherein the first bit sequence is generated according to a user-defined method.

22. A system for measuring a bit error rate on a network path, the system comprising:
   a bit error rate tester, coupled to the network path, that transmits and receives a bit sequence at a rate above 3 Gigabits per second and used for testing the bit error rate on the network path; and
   at least one network device, coupled to the network path, that inserts idles within a data stream containing the bit sequence;
   wherein the bit sequence is an incremental bit sequence.

23. The system of claim 22 wherein the at least one network device comprises a network repeater.

24. The system of claim 22 wherein the network operates at a rate equal to or higher than 9.9 gigabits/second.

25. The system of claim 22 wherein the network operates according to a protocol selected from a group consisting of Ethernet, Fibre Channel, ISCSI, SONET and Asynchronous Transfer Mode.

26. The system of claim 22 wherein the bit sequence is a pseudo-random bit sequence.

27. The system of claim 22 wherein the bit sequence is a user-defined bit sequence.

28. A bit error rate tester providing bit granularity measurements, the bit error rate tester comprising:

a generator that produces a bit sequence;

a bit sequence altering component, coupled to the generator, that alters the bit sequence prior to transmission onto a network path;

a bit sequence regenerator, coupled to receive a copy of the altered bit sequence, that stores the altered bit sequence prior to transmission onto a network path; and a comparator, coupled to receive the bit sequence from the network path and a regenerated bit sequence from the bit sequence regenerator, that measures bit errors within the bit sequence received from the network path.

29. The bit error rate tester of claim 28 further comprising a buffer, configured to receive the bit sequence from the network path, the buffer adapted to store a plurality of bits within the received bit sequence.

30. The bit error rate tester of claim 29 wherein the buffer captures a plurality of bits within the received bit sequence in response to a triggering event.

31. The bit error rate tester of claim 30 wherein the triggering event is a bit error rate crossing a pre-defined threshold.

32. The bit error rate tester of claim 30 wherein the triggering event is a specific word with a trigger-in option.

33. The bit error rate tester of claim 30 wherein the triggering event is a mis-compare with trigger-out option.

34. The bit error rate threshold of claim 29 wherein the buffer is a first-in first-out buffer.

35. A method for measuring bit errors at bit granularity, the method comprising:

generate a bit sequence;

modifying the bit sequence in a bit error rate tester internal path;

transmitting the modified bit sequence onto a network path;

receiving the bit sequence from the network path;

regenerating the modified bit sequence; and comparing the received bit sequence to the regenerated bit sequence.

36. The method of claim 35 further comprising a snoop function that stores and provides data regarding a triggering event.

37. The method of claim 36 wherein the snoop function stores data buffered data within a snoop buffer in response to the triggering event.

38. The method of claim 36 wherein the triggering event is a miscomparison between the regenerated bit sequence and the received bit sequence.

39. The method of claim 36 wherein the triggering event is a bit error rate crossing a pre-defined threshold.

* * * * *

UNITED STATES PATENT AND TRADEMARK OFFICE
CERTIFICATE OF CORRECTION

PATENT NO. : 7,032,139 B1  Page 1 of 1
APPLICATION NO. : 10/179760
DATED : April 18, 2006
INVENTOR(S) : Iryami et al.

It is certified that error appears in the above-identified patent and that said Letters Patent is hereby corrected as shown below:

Column 3
Line 52, change "300" to --300--

Column 7
Line 37, change "355" to --377--

Column 9
Line 26, change "438" to --435--

Column 10
Line 16, before "a long period" change "of" to --for--

Signed and Sealed this

Twenty-third Day of November, 2010

David J. Kappos
*Director of the United States Patent and Trademark Office*